J. Oakes.
Attitude Instrument.
N° 20,506. Patented Jun. 8, 1858.
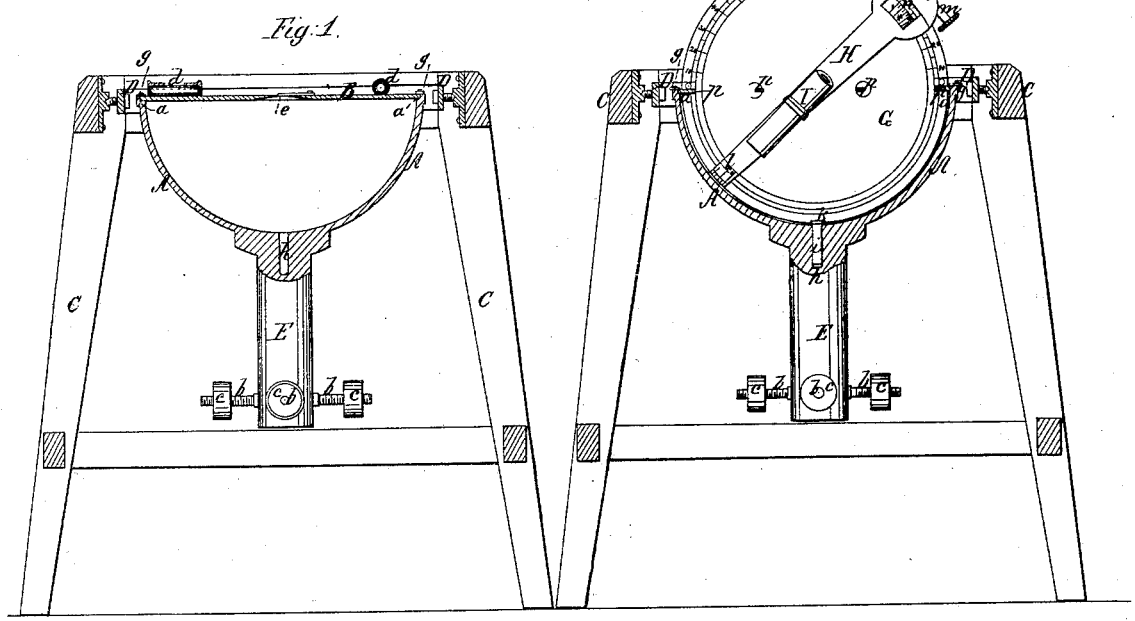
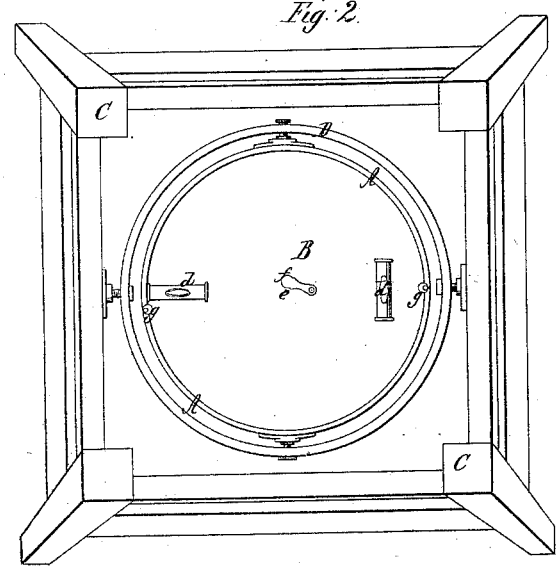
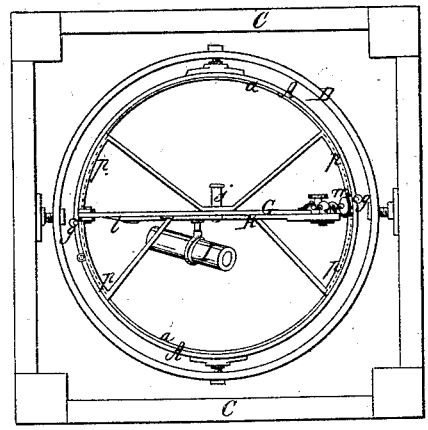

UNITED STATES PATENT OFFICE.

JNO. OAKES, OF NEW YORK, N. Y.

HELIOGRAPHIC INSTRUMENT FOR TAKING THE SUN'S ALTITUDE.

Specification of Letters Patent No. 20,506, dated June 8, 1858.

*To all whom it may concern:*

Be it known that I, JOHN OAKES, of the city, county, and State of New York, have invented a new and useful Instrument for Taking the Altitude of the Sun, which I term the "Helypsometer;" and I do hereby declare that the following is a full, clear, and exact description of the same, reference being had to the accompanying drawings, forming part of this specification.

The main object of this invention is to enable the altitude of the sun to be taken when the natural horizon is obscured by fog or otherwise invisible. The instrument consists of two parts, one of which is employed to record the altitude by the action of the sun's rays upon a sensitive coating of similar nature to those employed in photographic or heliographic processes, and the other to measure the altitude thus recorded. The first mentioned portion of the instrument consists of a hollow hemisphere whose equatorial plane is kept in a horizontal position or as nearly so as practicable, and has a small orifice in the center, and whose concave is prepared with the sensitive coating. The rays of the sun being admitted through the orifice above mentioned produce a mark or streak upon the sensitively prepared concave surface; and by applying the measuring portion of the instrument to measure off the distance in degrees of a circle from the equatorial plane of the hemisphere, the altitude is obtained, being represented by said distance in degrees.

In the accompanying drawings, Figure 1 represents an elevation of the instrument partly in section in a condition to receive the impression of the sun's rays to record or mark the altitude. Fig. 2 is a plan corresponding with Fig. 1. Fig. 3 is an elevation of the instrument partly in section, representing it with the measuring portion applied to measure the altitude as recorded by the sun's rays on the sensitively prepared surface. Fig. 4 is a plan corresponding with Fig. 3.

Similar letters of reference indicate corresponding parts in the several figures.

A, is a bowl of brass or other metal having its interior concave surface plated or otherwise lined with silver and having a rabbet $a$, turned or otherwise formed around the interior of the rim to receive a circular plate B which is fitted accurately therein and secured by buttons $g$, $g$, attached to the bowl A. The interior surface of the said bowl A, and the upper flat surface of the plate B, combine to form a true hemisphere. The bowl A is suspended by a gimbal D from the upper part of a frame or stand C which may be of wood, and it has attached to and below its bottom stem E, to the lower part of which are attached four arms $b$, $b$, radiating at 90° apart, and parallel with plate B, and on these arms are cut screw threads on which are screwed four weights $c$, $c$, which are capable of being screwed nearer to or farther from the stem to bring the surface of the plate B, which may be termed the horizon plate, in or parallel with the plane of the horizon, which condition is indicated by spirit levels $d$, $d$, secured to said plate.

$e$, (Figs. 1 and 2) is the central orifice of the horizontal plate B, through which the sun's rays are admitted to act upon the sensitive coating of the concave of the hemisphere. This orifice $e$, should be very small, and the plate B should be countersunk on the underside to make a sharp margin to the said orifice, so that said orifice may be exactly in the equatorial plane of the hemisphere.

$f$, is a slide attached to the plate B, to cover the orifice $e$, to shut out the light from the interior of the hemisphere to protect the sensitive coating from the action of light when the instrument is not in use.

The concave of the hemisphere, viz. the interior surface of the bowl A, is polished and has the sensitive preparation applied in any suitable manner. The manner in which I prefer to prepare it is as follows: The surface having been first plated with silver and polished, I subject it to the action of the vapor of iodin at any temperature above 40° F., till it assumes a bright gold color, and as soon afterward as convenient expose it for about two minutes over a cup of mercury whose temperature is about 170 F. This preparation is so sensitive to the action of light that, when exposed to the direct rays of the sun, it receives a visible impression of the image thereof almost instantaneously and requires no subsequent treatment to develop it. This preparation, if the surface is never exposed to a strong light, but always examined in as dark a place as will enable the image to be distinctly seen, will last in proper condition for many months, as I have found by experiment; and in almost all instances, when the instrument is to be used at sea, for which use it is more particularly intended, it will be sufficient to renew the said preparation at the end of every voyage or passage.

To record the altitude of the sun upon the concave of the hemisphere, it is only necessary to place the instrument in the condition shown in Figs. 1 and 2, in a position in which it is exposed to the sun's rays when the sun shines brightly enough to cast a shadow and to uncover the orifice e, to admit the rays to the interior of the hemisphere to act upon the sensitive coating of the concave on which they produce a spot or streak according to the length of time the orifice e is left uncovered and the distance of said spot or streak from the surface of the horizon plate B, or edge of the bowl, measured along the concave of the hemisphere in degrees of a circle, gives the altitude of the sun. To take a meridian altitude, the instrument is placed in the sun's rays and the orifice uncovered shortly before it is supposed to be noon and left so till a short time after it is supposed to be noon. By this means a streak is produced upon the sensitive preparation, the lowest part of which corresponds with the sun's greatest or meridian altitude.

The part of the instrument for measuring the distance of the spot or streak produced on the sensitively prepared concave of the hemisphere consists in a circular plate G, of a diameter equal to or slightly less than that of the concave hemisphere and graduated all around one of its faces or on the upper half thereof in degrees or degrees and fractional parts thereof. This plate has a radial pivot i, which is fitted to a bearing h, in the bottom of the bowl A, the axis of which bearing coincides with the vertical axis of the hemisphere when the surface of the plate B is horizontal; the graduated plane surface of the said plate G being so arranged as to coincide with the axis of the pivot i, so that when said pivot is in the bearing h, said plane will bisect the hemisphere and the pivot being provided with a shoulder k, which supports it on the bottom of the bowl, so that the center of the plate G will be in the plane of the hemisphere. The plate G may be also provided with open segment formed stays p, p, which fit to the rabbet a, to keep the graduated plane of the plate in position relatively to the hemisphere.

The plate G, is fitted with a bar H which is attached by a pivot j, to the center of said plate and capable of turning on said pivot. The said bar H has an index or graduated piece l, secured rigidly to one extremity and a vernier n, and adjusting screw m, at the opposite end; the zero point of said vernier—considered relatively to the diameter of plate G,—being directly opposite the index or zero point of l; and the said bar has attached to it a magnifying glass I, occupying an oblique position to enable the point of the index or zero of the piece l, and the spot or streak on the concave of the hemisphere to be seen clearly when the plate G is attached to the instrument to facilitate the adjustment of said index or piece l, to the said spot or streak.

Before applying the measuring portion of the instrument just described the plate B should be removed but before doing this the instrument should be taken out of the sun's rays in a place where there is but little light. The measuring portion of the instrument being applied in the manner represented in Figs. 3 and 4, the index or zero point at l, is brought opposite to the spot or streak on the concave, and the angle read off by the vernier or the graduated circle or arc of the plate G, whose graduations are inscribed from 0 to 90°, commencing at the horizontal line as shown in Fig. 3, is the sun's altitude. As on board a ship or other vessel at sea, there is almost always some motion, the streak produced on the concave when the instrument is used at sea will be wider than the orifice e, and hence it will be necessary to measure the altitude by the upper and lower margins of the spot or streak, then add the two altitudes together and divide by two, which gives the correct altitude of the sun's center; as whatever vibration of the horizon plate B takes place will be as much above as below the real horizon.

The instrument may be used many times without repolishing and renewing the sensitive preparation; as owing to the smallness of the marks produced by the sun's image and the large area of the sensitive surface, the observer, by noticing where the marks have been produced in previous observations, will be enabled to turn the stand of the instrument to such a position that the image will never fall a second time upon the same place even if similar altitudes be taken repeatedly. Every mark as soon as the altitude has been measured should be marked with some style or point that will not scratch the plate, but will prevent the confusion of the old marks with the new ones. In taking two observations at short intervals of time, the image will be prevented falling on points so near together as to produce confusion by simply turning the stand a little way before taking the second observation.

When the instrument is constructed specially for use on land, it need not be suspended in gimbals or balanced by pendulous weights, but may be attached to the frame and made adjustable thereon by screws applied in the same manner as those for adjusting surveying instruments.

I have stated at the commencement of this specification that the main object of this invention is to find the altitude of the sun when the horizon is obsured; but I by no means intend to confine its application to that condition, as it is obvious that it can be used as well when the horizon is visible, but it is under the former condition that it possesses an advantage over the quadrant and sextant.

I do not confine myself to the use of any particular sensitive preparation for the concave surface of the hemisphere. But

What I claim as my invention and desire to secure by Letters Patent is—

1. The hollow hemisphere having its concave surface prepared with a sensitive coating, and having an orifice in the center of its equatorial plane through which to admit the sun's rays to act upon the said sensitive coating, substantially as and for the purpose herein set forth.

2. And I also claim the graduated plate G, with its appendages combined with the hollow hemisphere, substantially as described for the purpose herein specified.

JOHN OAKES.

Witnesses:
W. TUSCH,
W. HAUFF.